United States Patent
Tominaga et al.

(10) Patent No.: US 7,030,185 B2
(45) Date of Patent: Apr. 18, 2006

(54) ELECTRODEPOSITION COATING COMPOSITIONS AND ARTICLES COATED THEREWITH

(75) Inventors: Akira Tominaga, Kanagawa (JP); Koji Kamikado, Kanagawa (JP); Susumu Midogochi, Kanagawa (JP)

(73) Assignee: Kansai Paint Co., Ltd., Kanagawa (JP)

( * ) Notice: Subject to any disclaimer, the term of this patent is extended or adjusted under 35 U.S.C. 154(b) by 105 days.

(21) Appl. No.: 10/445,813

(22) Filed: May 28, 2003

(65) Prior Publication Data

US 2004/0014870 A1    Jan. 22, 2004

(30) Foreign Application Priority Data

Jul. 17, 2002    (JP) .............................. 2002-207902

(51) Int. Cl.
*C08K 3/20*    (2006.01)
(52) U.S. Cl. ....................................... 524/591; 524/783
(58) Field of Classification Search ................ 524/783, 524/591, 592
See application file for complete search history.

(56) References Cited

U.S. PATENT DOCUMENTS

| | | | | |
|---|---|---|---|---|
| 5,001,173 A | * | 3/1991 | Anderson et al. | 523/406 |
| 5,190,830 A | * | 3/1993 | Matsuo et al. | 428/626 |
| 5,587,059 A | * | 12/1996 | Yamoto et al. | 204/505 |
| 6,641,711 B1 | * | 11/2003 | Sakamoto et al. | 205/224 |
| 6,716,909 B1 | * | 4/2004 | Harakawa et al. | 524/591 |
| 2003/0039757 A1 | * | 2/2003 | Yoneda et al. | 427/385.5 |

* cited by examiner

*Primary Examiner*—William K. Cheung
(74) *Attorney, Agent, or Firm*—Radar, Fishman & Grauer PLLC

(57) ABSTRACT

It is an object of the present invention to provide an electrodeposition coating composition excellent in corrosion resistance and stability of the coating. The electrodeposition coating composition comprises, based on 100 parts by weight (solid basis) of a core resin and a hardener constituting an electrodeposition coating, 1 to 100 parts by weight of (a) a zinc powder dispersed by a phosphoric-acid-group-containing dispersing resin.

9 Claims, No Drawings

ELECTRODEPOSITION COATING COMPOSITIONS AND ARTICLES COATED THEREWITH

TECHNICAL FIELD OF THE INVENTION

The present invention relates to an electrodeposition coating composition which exhibits, when applied to a cold rolled steel sheet, corrosion resistance upon atmospheric exposure equal to that when applied to a galvanized steel sheet; and an article coated with the electrodeposition coating composition.

DESCRIPTION OF RELATED ART

As steel sheets for automotive bodies, various ones such as hot-dip galvanized steel sheets and electrogalvanized steel sheets have been employed in addition to cold rolled steel sheets. These galvanized steel sheets are superior in corrosion resistance to cold rolled steel sheets so that they are used for bag-shaped parts of the car body which require high corrosion resistance, or doors or fenders whose film tends to be damaged by chipping.

SUMMARY OF THE INVENTION

Galvanized steel sheets are however accompanied with such problems that compared with cold rolled steel sheets, they are 1.5 to 3 times higher in cost and inferior in processability, and tend to cause a deterioration in finish appearance owing to the generation of gas pinhole, seeding upon electrodeposition coating work.

Because of excellent corrosion resistance of a film, cationic electrodeposition coatings using an amine-added epoxy resin are widely used now as a base coating for electroconductive materials such as car bodies. In addition, many pollution-free electrodeposition coatings excellent in environmental suitability and containing neither lead nor chromium are proposed. Even if cationic electrodeposition coatings are applied, corrosion resistance imparted to a cold rolled steel sheet is inferior to that imparted to a galvanized steel sheet, because the cold rolled steel sheet does not have sacrificial corrosion resistance as a galvanized steel sheet has.

It is therefore very important to develop an electrodeposition coating which exhibits, when applied even to a cold rolled steel sheet, equal corrosion resistance upon atmospheric exposure to that applied to a galvanized steel sheet.

With a view toward overcoming the above-described problem, the present inventors have carried out an extensive investigation. As a result, it has been found that when an electrodeposition coating composition having, incorporated therein, a zinc powder dispersed using a phosphoric-acid-group-containing dispersing resin is applied to a cold rolled steel sheet, corrosion resistance available thereby is equal to that available by the application of it to a galvanized steel sheet, leading to the completion of the present invention.

In the present invention, there are thus provided an electrodeposition coating composition comprising, based on 100 parts by weight (solid basis) of a core resin and a hardener each constituting an electrodeposition coating, approximately 1 to 100 parts by weight of (a) a zinc powder dispersed by a phosphoric-acid-group-containing dispersing resin.

The electrodeposition coating composition may comprise, based on 100 parts by weight (solid basis) of the core resin and the hardener constituting the electrodeposition coating, approximately 6 to 60 parts by weight of a zinc-powder-dispersed paste obtained by dispersing the zinc powder (a) by using the phosphoric-acid-group-containing dispersing resin (b) while mixing (a) and (b) at a weight ratio falling within a range of from approximately 0.5 to 2.

The present invention also provides an article coated with the electrodeposition coating as described above.

DETAILED DESCRIPTION OF THE INVENTION

The electrodeposition coating and article coated therewith according to the present invention will next be described more specifically.

The present invention relates to an electrodeposition coating composition comprising a zinc-dispersed paste (c) available by dispersing (a) zinc powder by using a phosphoric-acid-group-containing dispersing resin (b); and/or an electrodeposition coating composition obtained by incorporating a zinc-dispersed paste (c) in an electrodeposition coating which has been prepared in advance; and an article coated with the above-described electrodeposition coating composition. Zinc powder (a): It is conventionally known that although the zinc powder (a) is a less noble metal than iron, it is effective for corrosion inhibition owing to its sacrificial corrosion or oxide film, and moreover is effective for improvement in the curing property of a film owing to its catalytic action. A metal zinc was however not used before, because addition of it to an electrodeposition coating, however, caused elution of a zinc ion in an electrodeposition bath, which coagulated the emulsion, generated seeding in the coating or left a residue after filtration, thereby deteriorating the finish appearance of the coated surface or causing clogging of a filter.

The present inventors have conducted an extensive investigation with a view to stably incorporating zinc powder (a) having the above-described properties in an electrodeposition coating upon its storage or upon stirring. As a result, they have found that addition, to an electrodeposition coating, of a zinc-dispersed paste (c) obtained by dispersing the zinc powder (a) by using a phosphoric-acid-group-containing dispersing resin (b) imparts the resulting composition with stability.

The zinc powder (a) is made of a metal zinc and may have an average particle size adjusted to fall within a range of from 0.5 to 10 µm, preferably from 1 to 5 µm, more preferably from 2 to 3 µm.

The zinc powder (a) may be subjected to various surface treatments (for example, treatment with silica, phosphoric acid, chromic acid, fatty acid or polymer) in advance. Such a treatment is however not inevitable.

The phosphoric-acid-group-containing dispersing resin (b) is a phosphoric-acid-group-containing resin represented by the formula: [—OPO(OR)(OH)] (wherein, R represents a hydrogen atom and/or a $C_{4-10}$ hydrocarbon group). Preferably, this dispersing resin may further contain an anionic group such as carboxyl group or a cationic group such as quaternary ammonium base or tertiary sulfonium base.

The phosphoric-acid-group-containing dispersing resin (b) is available, for example, by the copolymerization of a phosphoric-acid-group-containing polymerizable monomer represented by the formula: [—OPO(OR)(OH)] and another polymerizable monomer.

The phosphoric-acid-group-containing polymerizable monomer is available by reacting, with a glycidyl-containing polymerizable monomer such as glycidyl acrylate or glycidyl methacrylate, one acidic hydroxyl group contained in a phosphate having, in one molecule thereof, one phosphoric acid group represented by the formula: [—OPO(OR)(OH)] (wherein, R represents a hydrogen atom and/or a $C_{4-10}$ hydrocarbon group) and one polymerizable double bond, such as monobutyl phosphate [(HO)$_2$P(O) (OC$_4$H$_9$)] or monoisodecyl phosphate [(HO)$_2$P (O) (OC$_{10}$H$_{21}$)].

Alternatively, (2-acryloyloxyethyl) acid phosphate, (2-methacryloyloxyethyl) acid phosphate, (2-acryloyloxypropyl) acid phosphate or (2-methacryloyloxypropyl) acid phosphate is usable.

Examples of the another polymerizable monomer include 1) acrylic ester monomers: esters of (meth)acrylic acid and a $C_{1-24}$ monoalcohol such as methyl (meth)acrylate, ethyl (meth)acrylate, propyl (meth)acrylate, butyl (meth)acrylate, 2-ethylhexyl (meth)arylate and lauryl (meth)acrylate; 2) hydroxyl-containing monomers: monoesters of (meth) acrylic acid and a $C_{2-10}$ glycol such as hydroxyethyl (meth) acrylate and hydroxypropyl (meth)acrylate; 3) carboxyl-containing monomers: acrylic acid, methacrylic acid, maleic acid and maleic anhydride; 4) onium-base-containing monomers: reaction products of glycidyl (meth)acrylate and a tertiary amine, or a secondary sulfide and a monocarboxylic acid; and 5) the other monomers: styrene, α-methylstyrene, (meth)acrylonitrile, vinyl toluene and vinyl acetate. This resin can be prepared by polymerizing the above-described polymerizable monomers in the presence of a polymerization initiator by the solution polymerization method which is known in the art.

Although the constitution ratio of these polymerizable monomers in the polymerization reaction can be selected freely depending on the using purpose and there is no particular limitation imposed on it, it is suited to add the phosphoric-acid-containing polymerizable monomer in an amount ranging from 1 to 30 wt. %, preferably from 5 to 20 wt. % and the another polymerizable monomer in an amount ranging from 70 to 99 wt. %, preferably from 80 to 95 wt. %, each based on the total amount of the phosphoric-acid-containing polymerizable monomer and the another polymerizable monomer.

The resin may have a weight-average molecular weight ranging from 3000 to 100000, preferably from 5000 to 50000, particularly preferably from 5000 to 30000. It has suitably an acid value ranging from 20 to 140 mgKOH/g, particularly from 40 to 120 mgKOH/g based on a phosphoric acid group; an acid value of 100 mgKOH/g or less based on a carboxyl group; and a hydroxyl number ranging from 0 to 120 mgKOH/g, particularly from 15 to 100 mgKOH/g.

As the phosphoric-acid-group-containing dispersing resin (b), reaction products between an epoxy resin and monobutyl phosphate or orthophosphoric acid, reaction products between a glycidyl-containing acrylic resin and monobutyl phosphate or orthophosphoric acid, reaction products between a polymer of styrene and an allyl alcohol, and orthophosphoric acid, and phosphate esters of polycaprolactone are also usable.

The phosphoric-acid-group-containing epoxy resin is available by reacting an epoxy resin with monobutyl phosphate or orthophosphoric acid. As the epoxy resin used as a starting material, an epoxy resin available by the reaction between a polyphenol compound and epichlorohydrin is suited from the viewpoints of corrosion resistance of the film. The epoxy resin preferably has an average molecular weight of from 1,000 to 10,000, more preferably from 2,000 to 5,000. Examples of the commercially available products of such an epoxy resin include "EPICOAT 828 EL", "EPICOAT 1002", "EPICOAT 1004" and "EPICOAT 1007" (each, trade name, product of Japan Epoxy Resin). These epoxy resins are usable as are. It is needless to say that epoxy resins modified by plasticization are also usable.

It is preferred to add, to an electrodeposition coating, 6 to 60 parts by weight of a zinc-dispersed paste (c)—which is available by mixing the zinc powder (a) and the phosphoric-acid-group-containing dispersing resin (b) to give a weight ratio of the zinc powder (a) to the phosphoric-acid-group-containing dispersing resin (b) ranging from 0.5 to 2 and then dispersing the resulting mixture—based on 100 parts by weight (solid basis) of the core resin and curing agent constituting the electrodeposition coating.

At a weight ratio of the zinc powder (a) to the phosphoric-acid-group-containing dispersing resin (b) less than 0.5, a zinc ion is eluted in the coating, thereby impairing its stability. Weight ratios exceeding 2 impair water resistance of the film. Weight ratios outside the above-described range are therefore not preferred even though the electrodeposition coating may be use.

The zinc-dispersed paste (c) made of the zinc powder (a) and phosphoric-acid-group-containing dispersing resin (b) may contain another pigment. As the pigment, those used for electrodeposition coatings are usable without particular limitation. Examples include coloring pigments such as titanium oxide, carbon black and red oxide; rust inhibitive pigments such as aluminum phosphomolybdate, aluminum tripolyphosphate, bismuth oxide hydrate and antimony oxide; and extender pigments such as clay, mica, baryta, calcium carbonate and silica. In addition, a curing catalyst, anti-settling agent and the like may be added as needed.

Although the electrodeposition coating to be added with the zinc-dispersed paste (c) may be either an anionic type or cationic type, the anionic type is advantageous, because the deposition bath preferably has a pH of 6 to 9, more preferably 7 to 8 from the viewpoint of the stability of the coating.

No particular limitation is imposed on the core resin and curing agent to be used for the electrodeposition coating. Typical examples of the core resin include anionic or cationic epoxy resins, acrylic resins, polyurethane resins and polyester resins, while those of the curing agent include block polyisocyanate and melamine resins.

Of these, use of an anionic acrylic resin or a cationic epoxy resin as the core resin and a block polyisocyanate compound as the crosslinking agent in combination is preferred from the viewpoint of the stability of the coating.

In this case, use of a curing catalyst is effective for accelerating the crosslinking reaction of the core resin and curing agent. Examples include tin octoate, dibutyltin dilaurate, dibutyltin dibenzoate, lead acetate, lead silicate, bismuth lactate, bismuth hydroxide, zinc octylate and zinc formate. Its amount preferably falls within a range of from 0.1 to 10 parts by weight based on 100 parts by weight of the total of the core resin and curing agent (as solid).

The zinc-dispersed paste (c) is available by diluting the phosphoric-acid-group-containing dispersing resin (b) with water; optionally adding another pigment, additive, and curing catalyst to the diluted resin and pre-kneading the resulting mixture; dispersing the diluted resin or the resulting mixture in a ball mill or sand mill to give a particle size of from 0.1 to 15 μm, preferably from 0.5 to 10 μm; and adding the zinc powder (a) and dispersing the resulting mixture. The zinc-dispersed paste (c) thus obtained is added to an emulsion, which has been obtained by dispersing the core resin and curing agent, in an amount of from 5 to 60 parts by weight, based on 100 parts by weight (solid basis), of the total amount of the core resin and curing agent, whereby an electrodeposition coating composition can be prepared. A description will next be made of the electrodeposition coating composition containing the zinc-dispersed paste (c).

Anionic Electrodeposition Coating

An anionic electrodeposition coating is obtained by neutralizing a carboxyl-containing anionic type resin with an amine and then dispersing the resulting resin in water. Conventionally used ones as an anionic electrodeposition coating which are known in the art are usable.

In particular, use of an acrylic resin having, incorporated therein, a carboxyl group and a hydroxyl group as an anionic resin is suited, because the film of the resulting coating is excellent in weather resistance and flatness. As the anionic resin, carboxyl- and hydroxyl-containing epoxy resins, polyester resins, polyurethane resins and vinyl resins are also usable.

When the carboxyl group of the anionic type resin is neutralized with a neutralizer, for example, an organic amine such as ammonia, diethylamine, ethylethanolamine, diethanolamine, monoethanolamine, monopropanolamine, isopropanolamine, ethylaminoethylamine, hydroxyethylamine or diethylenetriamine, or an alkali metal hydroxide such as caustic soda or caustic potash, the resin can be dissolved or dispersed in water.

As the carboxyl- and hydroxyl-containing acrylic resin, copolymers obtained by the radical polymerization of a carboxyl-containing unsaturated monomer, a hydroxyl-containing acrylic monomer and, if necessary, another polymerizable monomer are usable.

Monomers as described below are usable. The carboxyl-containing unsaturated monomer is a compound having, in one molecule thereof, one carboxyl group and one polymerizable unsaturated bond. Examples include (meth)acrylic acid, maleic acid, and caprolactone-modified carboxyl-containing (meth)acrylic monomers ("PLACCEL FM1A", "PLACCEL FM4A", "PLACCEL FM10A", each trade name; product of Daicel Chemical Industries, Ltd.).

The hydroxyl-containing acrylic monomer is a compound having, in one molecule thereof, one hydroxyl group and one polymerizable unsaturated bond. Examples include hydroxyethyl (meth)acrylate, hydroxypropyl (meth)acrylate, hydroxybutyl (meth)acrylate, (poly)ethylene glycol mono(meth)acrylate, (poly)propylene glycol mono(meth)acrylate, and reaction products of such a hydroxyl-containing acrylic monomer with a lactone compound such as β-propiolactone, dimethyl propiolactone, butyrolactone, γ-valerolactone, γ-caprolactone, γ-caprylolactone, γ-laurylolactone, ε-caprolactone or δ-caprolactone. Examples of the commercially available products include "PLACCEL FM1", "PLACCEL FM2", "PLACCEL FM3", "PLACCEL FA1", "PLACCEL FA2" and "PLACCEL FA3" (each, trade name of caprolactone-modified hydroxy (meth)acrylate; product of Daicel Chemical Industries, Ltd.).

The another polymerizable monomer is a compound other than the above-described carboxyl-containing unsaturated monomers and hydroxyl-containing acrylic monomers and having, in one molecule of the compound, at least one polymerizable unsaturated bond. Examples include $C_{1-16}$ alkyl or cycloalkyl (meth)acrylates such as methyl (meth)acrylate, ethyl (meth)acrylate, propyl (meth)acrylate, butyl (meth)acrylate, hexyl (meth)acrylate, octyl (meth)acrylate, lauryl (meth)acrylate and cyclohexyl (meth)acrylate, aromatic polymerizable monomers such as styrene, (meth)acrylamides such as (meth)acrylic amide, N-butoxymethyl (meth)acrylamide and N-methylol (meth)acrylamide and derivatives thereof; (meth)acrylonitrile compounds and alkoxysilyl-containing polymerizable monomers such as γ-(meth)acryloxypropyltrimethoxysilane, γ-(meth)acryloxypropylmethyldimethoxysilane, γ-(meth)acryloxypropyltriethoxysilane and vinyltrimethoxysilane.

With regards to the mixing ratio of these monomers, the carboxyl-containing unsaturated monomer may be added so that the acid value of the resulting copolymer will fall within a range of from about 10 to 200 mgKOH/g. Based on the total weight of the monomers, the carboxyl-containing unsaturated monomer is added in an amount of from about 3 to 30 wt. %, particularly preferably from about 4 to 20 wt. %. The hydroxyl-containing unsaturated monomer may be added so that the hydroxyl number of the resulting copolymer will fall within a range of from about 30 to 300 mgKOH/g. Based on the total weight of the monomers, the hydroxyl-containing unsaturated monomer is added in an amount of from about 3 to 40 wt. %, particularly preferably from about 5 to 30 wt. %.

Use of, as the another monomer, $C_{1-16}$ alkyl or cycloalkyl (meth)acrylates and aromatic monomers such as styrene is preferred. The another monomer is added in an amount ranging from about 37 to 95 wt. %, particularly preferably from about 60 to 91 wt. %, based on the total weight of the monomers.

These monomers are subjected to radical copolymerization in accordance with the conventionally known solution polymerization method. The acrylic resin thus obtained has a number average molecular weight of 10000 or less, with a range of from 4000 to 8000 being particularly suited.

No particular limitation is imposed on the cross-linking agent to be added to the anionic electrodeposition coating. Examples include block polyisocyanate compounds, melamine resins and polyoxazoline compounds. Of these, use of block polyisocyanate compounds is particularly preferred.

The block polyisocyanate compounds are obtained by blocking the isocyanate group of a polyisocyanate compound with a blocking agent. By heating, the blocking agent is dissociated from the compound to regenerate a free isocyanate group, and this isocyanate group crosslinks with active hydrogen such as a hydroxyl group in the resin.

Examples of the polyisocyanate compound include aliphatic polyisocyanates, and biuret type adducts or isocyanurate-ring adducts thereof; alicyclic diisocyanates, and biuret type adducts or isocyanurate-ring adducts thereof; aromatic diisocyanate compounds, and biuret type adducts or isocyanurate-ring adducts thereof; aromatic polyisocyanates, and biuret type adducts or isocyanurate-ring adducts thereof; and urethanized adducts obtained by reacting a polyisocyanate compound, and biuret type adducts or isocyanurate-ring adducts thereof.

As the blocking agent, ether alcohol, oxime, acid amide, imidazole, carbamate ester, and imine type ones are usable, of which low-temperature dissociation type blocking agents such as oxime and active methylene type ones are particularly preferred.

With regards to a ratio of the anionic type resin to the crosslinking agent, the former one is added in an amount ranging from 50 to 90 wt. %, particularly preferably from 60 to 80 wt. %, while the latter one is added in an amount of from 50 to 10 wt. %, particularly preferably from 40 to 20 wt. %, each based on the total weight (solid basis) of these two components.

Particularly in the present invention, use of an anionic electrodeposition coating having, incorporated therein, the carboxyl- and hydroxyl-containing acrylic resin and the block polyisocyanate compound at the above-described ratio is preferred.

The anionic electrodeposition coating can be prepared by mixing the zinc-dispersed paste (c), which has been obtained by dispersing the zinc powder (a) by using the phosphoric-acid-group-containing dispersing resin (b), with an emulsion obtained by dispersing the above-described core resin and curing agent. Upon mixing, the zinc-dispersed paste is added in an amount of 6 to 60 parts by weight based on 100 parts by weight (solid basis) of the core resin and curing agent.

Such an anionic electrodeposition coating is used after adjusting its solid concentration to fall within a range of from 3 to 40 wt. %, preferably from 5 to 25 wt. % and pH to fall within a range of from 6 to 9, preferably from 7 to 8.

Cationic Electrodeposition Coating

For an emulsion for a cationic electrodeposition coating, the electrodeposition bath must have a pH of 6 to 9, preferably pH 7 to 8, similar to that for the anionic electrodeposition coating. An onium salt resin is preferred. Examples of the onium base include ammonium base, sulfonium base and phosphonium base. It is available by reacting an epoxy group with a tertiary amine or secondary sulfide, together with a monocarboxylic acid.

Although onium salt resins known in the art are usable, onium salt type epoxy resins are particularly suited because the film available therefrom has excellent corrosion resistance.

As the epoxy resin serving as a starting material, those available by the reaction between a polyphenol compound and epichlorohydrin are particularly suited from the viewpoint of the corrosion resistance of the film.

The epoxy resin usable in the present invention has an epoxy equivalent ranging generally from 180 to 2,500, preferably from 200 to 2,000, more preferably from 400 to 1,500, and that having a number average molecular weight of generally 200 or greater, particularly from 400 to 4,000, more preferably from 800 to 2,500 is suited. Examples of the commercially available products of such an epoxy resin include "EPICOAT 828 EL, "EPICOAT 1002", "EPICOAT 1004", and "EPICOAT 1007" (each, trade name; product of Japan Epoxy Resin Co., Ltd.).

The above-described epoxy resin is usable as is, but that modified by plasticization is also usable. As the plasticizing modifier of the epoxy resin, hydrophobic one having compatibility with an epoxy resin is preferred.

The amount of the modifier must be suppressed to the minimum necessary for plasticization and an amount of 5 to 50, more preferably 10 to 30 parts by weight, based on 100 parts by weight of the epoxy resin is preferred. Preferred examples of the modifier include xylene formaldehyde resins and polycaprolactone having reactivity with an epoxy group.

Block polyisocyanate compounds usable as a crosslinking agent can be added. Block polyisocyanate compounds similar to those used in the anionic electrodeposition coating are usable.

A cationic electrodeposition coating is prepared by adding, to the above-described emulsion, the zinc-powder-dispersed paste (c), which has been obtained by dispersing the zinc powder (a) by using the phosphoric-acid-group-containing dispersing resin (b), deionized water and if necessary, a neutralizer and additive. Upon use, the resulting cationic electrodeposition coating is adjusted to have a solid concentration ranging from about 5 to 40 wt. %, preferably from 15 to 25 wt. % and a pH from 6.0 to 9.0.

In either the anionic electrodeposition coating or cationic electrodeposition coating, no particular limitation is imposed on the material to be coated therewith insofar as it has a metal surface to which the electrodeposition coating can be applied. As the material to be coated, however, a cold rolled steel sheet is preferred from the viewpoints of cost, processability and generation of pin holes upon application. Prior to application of the electrodeposition coating, surface treatment with zinc phosphate is preferred for corrosion prevention.

The anionic or cationic electrodeposition coating can usually be applied to the surface of a desired material under the conditions of a bath temperature adjusted to 15 to 35° C. and a load voltage of from 100 to 400V. Although there is no particular limitation imposed on the film thickness formed by the application of the electrodeposition coating, it usually falls within a range of from 10 to 40 µm, particularly preferably from 15 to 35 µm, each in terms of a cured film.

The film thus formed is cured by heating at a temperature ranging from about 130 to 200° C., preferably from 150 to 170° C. Any baking and drying means can be adopted and examples include direct drying method in an electric furnace or gas furnace, indirect drying method by hot-air drying, heating by infrared rays or far infrared rays, and high-frequency induction heating.

EXAMPLES

The present invention will hereinafter be described in further detail by Examples. It should however be borne in mind that the present invention is not limited by them. Incidentally, "part" or "parts", and "%" mean "part by weight" or "parts by weight", and "wt. %", respectively.

Preparation Example 1

Preparation of Dispersing Resin No. 1 (for Anionic Electrodeposition Coating)

In a reaction vessel equipped with a stirrer, a temperature controller and a condenser was charged a mixed solvent composed of 27.5 parts of methoxypropanol and 27.5 parts of isobutanol. After heating the solvent to 110° C. and maintaining it at the same temperature, 121.5 parts of a mixture containing 25 parts of styrene, 27.5 parts of 2-ethylhexyl methacrylate, 20 parts of 2-hydroxyethyl methacrylate, 7.5 parts of 4-hydroxybutyl acrylate, 15 parts of a 50% phosphoric-acid-group-containing polymerizable monomer (Note 1), 12.5 parts of 2-methacryloyloxyethyl acid phosphate, 10 parts of isobutanol and 4 parts of t-butyl peroxyoctanoate was added dropwise to the mixed solvent over 4 hours. A mixture composed of 0.5 part of t-butyl peroxyoctanoate and 20 parts of isopropanol was added dropwise further over 1 hour. The reaction mixture was then matured by stirring under heat for 1 hour, whereby a dispersing resin No. 1 having an acid value, based on a phosphoric acid group, of 83 mgKOH/g, a weight average molecular weight of 10000 and a solid content of 50% was obtained. (Note 1) Phosphoric-acid-containing polymerizable monomer: In a reaction vessel equipped with a stirrer, a temperature controller and a condenser, were charged 57.55 parts of monobutylphosphoric acid and 41.1 parts of isobutanol. The resulting mixture was maintained at 110° C. After dropwise addition of 42.45 parts of glycidyl methacrylate over 2 hours under ventilation, the reaction mixture was matured under stirring for 1 hour at the same temperature. The reaction mixture was then diluted with 58.88 parts of isopropanol, whereby a phosphoric-acid-group-containing polymerizable monomer solution having an acid value, based on a phosphoric acid group, of 285 mgKOH/g was obtained.

Preparation Example 2

Preparation of Zinc-Dispersed Paste No. 1 (for Anionic Electrodeposition Coating)

The dispersing resin No. 1 (10 parts, solid content: 5 parts) having a solid content of 50%, which had been prepared in Preparation Example 1, 15 parts of titanium white, 0.1 part of carbon black, 2 parts of finely divided silica (Note 1), 1 part of dibutyltin oxide and 18.1 parts of deionized water were mixed. After the resulting mixture was dispersed for 20 hours in a ball mill, 5 parts of zinc powder was added and the resulting mixture was stirred for 1 hour, whereby a zinc-dispersed paste No. 1 having a solid content of 50% was obtained.

Preparation Example 3

Preparation of Zinc-Dispersed Paste No. 2 (for Anionic Electrodeposition Coating)

The dispersing resin No. 1 (20 parts, solid content: 10 parts) having a solid content of 50%, which had been prepared in Preparation Example 1, 20 parts of zinc powder, 5 parts of finely divided silica, and 25 parts of deionized water were mixed. The resulting mixture was stirred and dispersed, whereby a zinc-dispersed paste No. 2 having a solid content of 50% was obtained.

Preparation Example 4

Preparation of Dispersing Resin No. 2 (for Cationic Electrodeposition Coating)

A bisphenol type epoxy resin (700 parts) having an epoxy equivalent of about 700 was dissolved in 993 parts of ethylene glycol monobutyl ether by heating at 90° C. To the resulting solution were added 110 parts of nonyl phenol, 61 parts of thiodiethylene glycol and 45 parts of lactic acid and they were reacted at 90° C. until the acid value would be 2 mgKOH/g or less. Then, the reaction mixture was cooled to 70° C., followed by the addition of 77 parts of monobutyl phosphate. The resulting mixture was matured at the same temperature for 1 hour, whereby a dispersing resin No. 2 having an acid value, based on a phosphoric acid group, of 56.5 mgKOH/g and a solid content of 50% was obtained.

Preparation Example 5

Preparation of Zinc-Dispersed Paste No. 3 (for Cationic Electrodeposition Coating)

The dispersing resin No. 2 (10 parts, solid content: 5 parts) obtained in Preparation Example 4, 10 parts of zinc powder, 3 parts of finely divided silica and 13 parts of deionized water were mixed and dispersed by stirring, whereby a zinc-dispersed paste No. 3 having a solid content of 50% was obtained.

Compositions of zinc-dispersed pastes Nos. 1 to 3 are shown in Table 1.

TABLE 1

| Composition | No. 1 Preparation Example 2 | No. 2 Preparation Example 3 | No. 3 Preparation Example 5 |
|---|---|---|---|
| 50% Pigment dispersing resin No. 1 | 10 (5) | 20 (10) | |
| 50% Pigment dispersing resin No. 2 | | | 10 (5) |
| Titanium white | 15 | | |
| Carbon black | 0.1 | | |
| Finely divided silica (Note 1) | 2 | 5 | 3 |
| Dibutyltin oxide | 1 | | |
| Deionized water | 18.1 | 25 | 13.1 |
| Dispersing step | Included | | |
| Zinc powder | 5 | 20 | 10 |
| 50% pigment dispersed paste | 56.2 (28.1) | 70 (35) | 36.2 (18.1) |

(Note 1)
Finely divided silica: "AEROSIL R972" (trade name; product of Nippon Aerosil)

Preparation Example 6

Preparation of Emulsion No. 1 (for Anionic Electrodeposition Coating)

A mixture composed of 15 parts of styrene, 38 parts of methyl methacrylate, 15 parts of n-butyl acrylate, 10 parts of ethyl acrylate, 15 parts of 2-hydroxyethyl acrylate, 7 parts of acrylic acid and 7 parts of azobisdimethylvaleronitrile was added dropwise over 3 hours to 55 parts of isopropyl alcohol kept at 80° C. While maintaining this temperature for 1 hour, 1 part of azobisdimethylvaleronitrile and 13 parts of butyl cellosolve were added dropwise. The reaction was continued for further 4 hours at 80° C., whereby an acrylic resin (A) having an acid value of 55 mgKOH/g, a number average molecular weight of 6000, a hydroxyl value of 73 mgKOH/g and a solid content of 59% was obtained.

An emulsion No. 1 for anionic electrodeposition coating having a solid content of 32% was obtained by adding 118.6 parts (solid content: 70 parts) of the acrylic resin (A), 33.3 parts (solid content: 30 parts) of isophorone diisocyanate blocked with methyl ethyl ketoxime, triethylamine (neutralization equivalent: 0.7) and deionized water.

Preparation Example 7

Preparation of a Sulfonium-Base-Containing Epoxy Resin (for Cationic Electrodeposition Coating)

To 1010 g of "EPICOAT 828EL" (trade name of epoxy resin, product of Japan Epoxy Resin Co., Ltd.) were added 390 g of bisphenol A, 240 parts of polycaprolactone diol (number average molecular weight: about 1200) and 0.2 g of dimethylbenzylamine. The resulting mixture was reacted at 130° C. until it had an epoxy equivalent of about 1090.

Then, 183 g of thiodiethylene glycol and 90 g of acetic acid were added. After reaction at 120° C. for 4 hours, butyl cellosolve was added, whereby a sulfonium-base-containing epoxy resin having a sulfonium salt value of 44 mg KOH/g and a solid content of 71% was obtained.

Preparation Example 8

Preparation of a Curing Agent (for Cationic Electrodeposition Coating)

In a reaction vessel were charged 270 parts of "COS-MONATE M-200" (trade name of crude MDI, product of Mitsui Chemicals) and 25 parts of methyl isobutyl ketone. The resulting mixture was heated to 70° C. To the reaction mixture were added 15 parts of 2,2-dimethylol butanoic acid in portions, followed by the dropwise addition of 118 parts of ethylene glycol monobutyl ether. After reaction at 70° C. for 1 hour, the reaction mixture was cooled to 60° C. and 152 parts of propylene glycol was added. While keeping the temperature at 60° C., sampling was carried out with the passage of time. The disappearance of absorption of an unreacted isocyanato group was confirmed by measuring infrared absorption spectrum, whereby a curing agent having a solid content of 80% was obtained.

Preparation Example 9

Preparation of Emulsion No. 2 (for Cationic Electrodeposition Coating)

After 105 parts (solid content: 75 parts) of the sulfonium-base-containing epoxy resin having a solid content of 71%, which had been obtained in Preparation Example 7, 31 parts (solid content: 25 parts) of the curing agent having a solid content of 80%, which had been obtained in Preparation Example 8, and 1 part of dibutyltin dibenzoate were mixed, the resulting mixture was stirred uniformly. Deionized water (157 parts) was added dropwise to the uniform mixture over about 15 minutes while vigorously stirring, whereby an emulsion No. 2 having a solid content of 34.0% was obtained.

Example 1

Preparation of Anionic Electrodeposition Coating No. 1

After addition of 72.2 parts (solid content: 36.1 parts) of the 50% zinc-dispersed paste No. 1 to 312.5 parts (solid content: 100 parts) of the emulsion No. 1 (for anionic electrodeposition coating) having a solid content of 32%, which had been obtained in Preparation Example 6, the resulting mixture was diluted with 295.8 parts of deionized water, whereby an anionic electrodeposition coating No. 1 having a solid content of 20% was obtained.

Example 2

Preparation of Anionic Electrodeposition Coating No. 2

After addition of 68.2 parts (solid content: 34.1 parts) of the 50% zinc-dispersed paste No. 2 to 312.5 parts (solid content: 100 parts) of the emulsion No. 1 (for anionic electrodeposition coating) having a solid content of 32%, which had been obtained in Preparation Example 6, the resulting mixture was diluted with 289.8 parts of deionized water, whereby an anionic electrodeposition coating No. 2 having a solid content of 20% was obtained.

Example 3

Preparation of Cationic Electrodeposition Coating No. 1

A cationic electrodeposition coating No. 1 having a solid content of 20% was obtained by adding 315.7 parts (solid content: 101 parts) of the emulsion No. 2 having a solid content of 32%, which had been obtained in Preparation Example 9, 72.2 parts (solid content: 36.1 parts) of the zinc-dispersed paste having a solid content of 50% obtained in Preparation Example 1 and 297.6 parts of deionized water.

Comparative Example 1

"ELECRON NO. 7100" (trade name of anionic electrodeposition coating; product of Kansai Paint) was employed.

Comparative Example 2

"ELECRON NO. 9600" (trade name of cationic electrodeposition coating; product of Kansai Paint) was employed.

The compositions of electrodeposition coatings are shown in Table 2.

TABLE 2

| Composition | Example 1 Anionic electrodeposition coating No. 1 | Example 2 Anionic electrodeposition coating No. 2 | Example 3 Cationic electrodeposition coating No. 1 | Comp. Ex. 1 | Comp. Ex. 2 |
|---|---|---|---|---|---|
| 32% Emulsion No. 1 | 312.5 (100) | 312.5 (100) | | ELECRON No. 7100 Anionic electrodeposition coating | ELECRON No. 9600 Cationic electrodeposition coating |
| 34% Emulsion No. 2 | | | 297 (101) | | |
| 50% Zinc dispersed paste No. 1 | 56.2 (28.1) | | | | |
| 50% Zinc dispersed paste No. 2 | | 70 (35) | | | |
| 50% Zinc dispersed paste No. 3 | | | 72 (36) | | |
| Deionized water | 271.8 | 292.5 | 316 | | |
| 20% Bath | 640.5 (128.1) | 675 (135) | 685 (137) | | |

Preparation of a Test Plate

To each of a cold rolled steel sheet (thickness; 0.8 mm) and galvanized steel sheet (thickness: 0.8 mm), each treated with "PALBOND #3020" (trade name of a zinc phosphate treating agent; product of Nihon Parkerizing Co., Ltd.), the anionic electrodeposition coating No. 1, anionic electrodeposition coating No. 2 and cationic electrodeposition coating No. 1, each obtained in Example and "ELECRON No. 7100" and "ELECRON No. 9600" as Comparative Example were applied to give a film thickness of 20 µm. After baking at 150° C. for 20 minutes, the plate thus obtained was provided for the below-described tests. The results are shown in Table 3.

TABLE 3

| Test items | | Example 1 Anionic electrodeposition coating No. 1 | Example 2 Anionic electrodeposition coating No. 2 | Example 3 Cationic electrodeposition coating No. 1 | Comp. Ex. 1 ELECRON No. 7100 | Comp. Ex. 2 ELECRON No. 9600 |
|---|---|---|---|---|---|---|
| Corrosion resistance (Note 3) | Cold rolled steel sheet | A | A | A | C | B |
|  | Galvanized steel sheet | — | — | — | A | A |
| Impact resistance (Note 4) | | A | A | A | A | A |
| Stability of coating (Note 5) | | A | A | A | A | A |
| Adhesion (Note 6) | | A | A | A | A | A |

(Note 3)
Corrosion resistance: Cross-cuts were made with a knife through the film of each of the cold rolled steel sheet and galvanized steel sheet to which electrodeposition coating was applied. The resulting plate was subjected to marine exposure (at Chikura-cho, Chiba-city) for 1 year to evaluate the degree of rust and swelling.

A: The maximum width of each of rust and swelling is 3.0 mm or less from the cut edge (on one side).

B: The maximum width of each of rust and swelling is 3.5 mm or greater but not greater than 4.5 mm from the cut edge (on one side).

C: The maximum width of each of rust and swelling is 5.0 mm or greater from the cut edge (on one side).

(Note 4): Impact resistance: A cold rolled steel sheet (thickness: 0.8 mm) was tested for impact resistance (point of impact: ½ inch, drop height: 50 cm) using a Dupont system in accordance with JIS K-5600 8.3.2 (ISO6272).

A: No cracks

B: Cracks are observed on the back side of the plate.

C: Cracks are observed on both sides of the plate.

(Note 5) Stability of the coating: Each coating was stirred at 30° C. Four weeks later, the coating was filtered through a 200-mesh metal sieve to evaluate the agglomeration state of the coating residue.

A: No agglomerates

B: Slight agglomerates

C: Many agglomerates (Note 6) Adhesion: To the plate to which each electrodeposition coating was applied, an intermediate coat TP-65-2 was applied to give a thickness of 35 µm, followed by baking at 140° C. for 20 minutes.

"NEOAMILAC 6000" (white) was then applied to give a thickness of 35 µm, followed by baking at 140° C. for 20 minutes, whereby a multicoated test plate was obtained.

The multicoated test plate was dipped in warm water of 40° C. for 10 days. On the surface of the resulting plate, 10×10 cross-cuts, each 2 mm square, were scribed and peeling state was evaluated using an adhesive tape.

A: Nothing abnormal.

B: No peeling but edge chipping occurred.

C: Peeling occurred.

It has been found that an electrodeposition coating composition excellent in corrosion resistance and stability of the coating can be prepared by incorporating, in an electrodeposition coating, a paste of the present invention having a metal zinc dispersed therein by using a phosphoric-acid-group-containing dispersing resin. The composition exhibits good corrosion resistance upon atmospheric exposure even when it is applied to a cold rolled steel sheet instead of a galvanized steel sheet, which makes it possible to produce coated articles excellent in long-term corrosion resistance at a low cost.

The disclosure of Japanese Patent Application No. 2002-207902 filed on Jul. 17, 2002 including specification, drawings and claims is incorporated herein by reference in its entirety.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

What is claimed is:

1. An electrodeposition coating composition comprising, based on 100 parts by weight (solid basis) of a core resin and a hardener constituting an electrodeposition coating, approximately 1 to 100 parts by weight of (a) a zinc powder dispersed by a phosphoric-acid-group-containing dispersing resin, wherein the electrodeposition coating is an onium-salt-containing cationic one and the hardener is a block polyisocyanate.

2. An electrodeposition coating composition of claim 1, which comprises, based on 100 parts by weight (solid basis) of the core resin and the hardener constituting the electrodeposition coating, approximately 6 to 60 parts by weight of a zinc-powder-dispersed paste obtained by dispersing the zinc powder (a) by the phosphoric-acid-group-containing dispersing resin (b) while mixing (a) and (b) at a weight ratio falling within a range of from 0.5 to 2.

3. An electrodeposition coating composition of any one of claims 1 and 2, wherein the phosphoric-acid-containing dispersing resin is obtained by the copolymerization of a phosphoric-acid-group-containing polymerizable monomer represented by the following formula:

[—OPO(OR)(OH)]

wherein, R represents a hydrogen atom and/or a $C_{4-10}$ hydrocarbon group, with another polymerizable monomer.

4. An electrodeposition coating of claim 1 or 2, wherein the phosphoric-acid-group-containing dispersing resin is obtained by the reaction between an epoxy resin and monobutyl phosphate or an orthophosphate ester.

5. An electrodeposition coating composition of claim 1 or 2, wherein the phosphoric-acid-group-containing dispersing resin is a copolymerization product of one or two monomers selected from acrylate ester monomers, hydroxyl-containing acrylate monomers and carboxyl-containing acrylate monomers and optionally, another polymerizable monomer.

6. Articles coated with an electrodeposition coating composition as claimed in claim 1 or 2.

7. Articles coated with an electrodeposition coating composition as claimed in claim 3.

8. Articles coated with an electrodeposition coating composition as claimed in claim 4.

9. Articles coated with an electrodeposition coating composition as claimed in claim 5.

* * * * *